United States Patent
Mandel

[19]

[11] Patent Number: 6,054,103
[45] Date of Patent: Apr. 25, 2000

[54] MIXING SYSTEM FOR PROCESSES USING SUPERCRITICAL FLUIDS

[75] Inventor: Frederick S. Mandel, Chagrin Falls, Ohio

[73] Assignee: Ferro Corporation, Cleveland, Ohio

[21] Appl. No.: 08/882,707

[22] Filed: Jun. 25, 1997

[51] Int. Cl.[7] .................................. B01J 3/00; B01J 8/10; F28D 21/00

[52] U.S. Cl. .......................... 422/208; 422/226; 422/242; 422/241; 422/229

[58] Field of Search ..................................... 422/119, 200, 422/229, 201, 198, 131, 137, 138, 227, 241, 242, 208, 226; 65/109.1, DIG. 323, DIG. 322, DIG. 324, DIG. 325, DIG. 318, DIG. 63; 366/144, 59, 319–324, 310, 67, 91; 220/585; 165/169, 156

[56] References Cited

U.S. PATENT DOCUMENTS

| | | | |
|---|---|---|---|
| 313,430 | 3/1885 | Kuhn | 165/92 |
| 954,511 | 4/1910 | Gordon | 366/320 |
| 1,911,608 | 5/1933 | Davis et al. | 220/585 |
| 2,772,860 | 7/1953 | Nelson | 165/156 |
| 2,939,770 | 6/1960 | Schwartzkopff et al. | 366/149 |
| 3,078,265 | 2/1963 | Berger et al. | 422/109 |
| 3,227,526 | 1/1966 | Scoggin | 23/288 |
| 3,249,342 | 5/1966 | Mikkelsen | 241/98 |
| 3,476,522 | 11/1969 | Stovall | 23/285 |
| 3,803,084 | 4/1974 | Schnurrbusch et al. | 528/14 |
| 3,877,881 | 4/1975 | Ono et al. | 23/285 |
| 3,926,738 | 12/1975 | Nyiri et al. | 195/127 |
| 3,981,957 | 9/1976 | van Brederode et al. | 260/878 R |
| 4,012,461 | 3/1977 | Van Brederode | 260/878 R |
| 4,022,438 | 5/1977 | Shishido et al. | 266/310 |
| 4,552,724 | 11/1985 | Matsumoto et al. | 422/138 |
| 4,582,731 | 4/1986 | Smith | 427/421 |
| 4,734,227 | 3/1988 | Smith | 264/13 |
| 4,734,451 | 3/1988 | Smith | 524/493 |
| 4,970,093 | 11/1990 | Sievers et al. | 427/38 |
| 5,009,367 | 4/1991 | Nielsen | 239/3 |
| 5,027,742 | 7/1991 | Lee et al. | 118/300 |
| 5,152,971 | 10/1992 | Bertrand et al. | 423/300 |
| 5,171,613 | 12/1992 | Bok et al. | 427/422 |
| 5,182,087 | 1/1993 | Lilja et al. | 422/228 |

(List continued on next page.)

FOREIGN PATENT DOCUMENTS

WO9409913  5/1994  WIPO.

OTHER PUBLICATIONS

Karen A. Larson et al., "Evaluation of Supercritical Fluid Extraction in the Pharmaceutical Industry," Biotechnology Progress, vol. 2, No. 2., Jun. 1986, pp. 73–82.

G. A. M. Diepen et al., "The Solubility of Napthtalene in Supercritical Ethylene," Dec. 1948, pp. 4085–4089.

Mark McHugh et al., "Solid Solubilities of Naphtalene and Biphenyl in Supercritical Carbon Dioxide,"Journal of Chemical Engineering Data, vol. 25, No. 4, 1980, pp. 326–329.

(List continued on next page.)

*Primary Examiner*—Marian C. Knode
*Assistant Examiner*—Susan Ohorodnik
*Attorney, Agent, or Firm*—Rankin, Hill, Porter & Clark LLP

[57] ABSTRACT

A mixing vessel for a process using supercritical process media, the vessel including an agitator for mixing a batch of materials and a process media in a supercritical state in the vessel to produce a reaction mixture based on a selectable reaction process; and heat transfer system for controlling temperature of the reaction mixture, the heat transfer system comprising a liner that generally conforms to an interior surface geometry of the vessel, with the liner comprising a high thermal conductivity material; the liner comprising an interior heat transfer surface in thermal exchange with the reaction mixture, and a plurality of fluid channels; heat transfer fluid that circulates through the channels and in thermal exchange with the heat transfer surface; and a heat transfer fluid supply exterior the pressure vessel for circulating the heat transfer fluid through the channels.

19 Claims, 5 Drawing Sheets

U.S. PATENT DOCUMENTS

| | | | |
|---|---|---|---|
| 5,248,485 | 9/1993 | Lilja et al. | 422/229 |
| 5,290,827 | 3/1994 | Shine | 523/340 |
| 5,380,485 | 1/1995 | Takahashi et al. | 422/62 |
| 5,399,597 | 3/1995 | Mandel et al. | 523/342 |
| 5,407,267 | 4/1995 | Davis et al. | 366/152 |
| 5,667,758 | 9/1997 | Matsugi et al. | 422/198 |
| 5,698,163 | 12/1997 | Mandel | 422/105 |

OTHER PUBLICATIONS

Hongju Chang et al., "Solubilities of Methoxy–1–tetralone and Methyl Nitrobenzoate Isomers and Their Mixtures in Supercritical Carbon Dioxide," Journal of Chemical Engineering Data, vol. 30, No. 1, 1985, pp. 74–78.

Ronald T. Kurnik et al., "Solubility of Solids in Supercritical Carbon Dioxide and Ethylene," Journal of Chemical and Engineering Data, vol. 26, No. 1, 1981, pp. 47–51.

Yu V. Tsekhanskaya et al., "Volume Changes In Naphthalene Solutions In Compressed Carbon Dioxide," Russian Journal of Physical Chemistry, vol. 40, No. 9, Sep. 1966, pp. 1152–1156.

Walter Cobbs et al., "High Solids Coatings Above 80% By Volume," presented at the Water–Borne & Higher Solids Coatings Symposium, Mar. 10–12, 1980, New Orleans, LA, pp. 175–192.

MIXING SYSTEM FOR PROCESSES USING SUPERCRITICAL FLUIDS

BACKGROUND OF THE INVENTION

The invention relates generally to apparatus for carrying out a process that uses supercritical fluids, such as, for example, a process for preparing coating materials as described in U.S. Pat. No. 5,399,597 and co-pending U.S. patent application Ser. No. 08/438,681 entitled "CONTROL SYSTEM FOR PROCESSES USING SUPERCRITICAL FLUID", the entire disclosures of which are both fully incorporated herein by reference. More specifically, the invention relates to improvements and alternative embodiments of the mixing system including the pressure vessel and agitator that are part of the overall system described in the aforementioned disclosures.

The systems described in the referenced disclosures are effective for many processes that use supercritical fluids. However, improvements in the pressure vessel (reactor tank) have been discovered which can significantly improve the overall performance and quality of the finished product for different reaction processes.

Temperature control within the pressure vessel (also referred to herein as the reactor vessel or tank) is an important part of the overall reaction process. It is especially important to provide a heat transfer system that can rapidly control changes of the reaction mixture within the pressure vessel. Although conventional heat/cool jackets can be used, as described in the referenced disclosures, some reaction processes may require a higher degree of control of temperature within the pressure vessel. This is particularly so for effecting and/or controlling rapid changes in temperature and pressure within the pressure vessel.

The agitator is also an important element of the overall system. The agitator not only is used for mixing the batch ingredients during the reaction process in the pressure vessel, but is also used for delivery or transfer of the finished reaction to the receiver vessel. Typical reaction processes can involve high viscosity slurries within the pressure vessel which conventional agitators may be inadequate to either mix or assist in the transfer of the finished reaction to the receiver.

The objectives exist, therefore, to provide a mixing system that improves the flexibility and utility of supercritical process systems as such as are described in the aforementioned disclosures.

SUMMARY OF THE INVENTION

To the accomplishment of the foregoing objectives, the invention contemplates, in one embodiment, apparatus for a process using supercritical process media, comprising a pressure vessel including an agitator for mixing a batch of materials therein; a source of process media supplied to the pressure vessel; heat transfer means for maintaining the process media in the pressure vessel in a supercritical state; and delivery means for introducing into the pressure vessel batch materials that are mixed in the presence of the process media in a supercritical state to produce a reaction mixture based on a selectable reaction process; the heat transfer means comprising a liner that generally conforms to an interior surface geometry of the pressure vessel, with the liner comprising a high thermal conductivity material; the liner comprising an interior heat transfer surface in thermal exchange with the reaction mixture, and a plurality of fluid channels; heat transfer fluid that circulates through the channels and in thermal exchange with the heat transfer surface; and heat transfer fluid supply means exterior the pressure vessel for circulating the heat transfer fluid through the channels.

The invention also contemplates in another embodiment a mixing vessel for a process using supercritical process media, the vessel comprising an agitator for mixing a batch of materials and a process media in a supercritical state in the vessel to produce a reaction mixture based on a selectable reaction process; and heat transfer means for controlling temperature of the reaction mixture, the heat transfer means comprising a liner that generally conforms to an interior surface geometry of the vessel, with the liner comprising a high thermal conductivity material; the liner comprising an interior heat transfer surface in thermal exchange with the reaction mixture, and a plurality of fluid channels; heat transfer fluid that circulates through the channels and in thermal exchange with the heat transfer surface; and heat transfer fluid supply means exterior the pressure vessel for circulating the heat transfer fluid through the channels.

The invention also contemplates an agitator for reaction processes using supercritical process media, comprising: a drive shaft, impeller blades in the form of a double helix and which extend longitudinally about the drive shaft; and at least one radial impeller blade disposed near the periphery of the double helix and that extends longitudinally along the drive shaft.

These and other aspects and advantages of the present invention will be readily understood and appreciated by those skilled in the art from the following detailed description of the invention with the best mode contemplated for practicing the invention in view of the accompanying drawings.

DETAILED DESCRIPTION OF THE INVENTION

Figure 1:
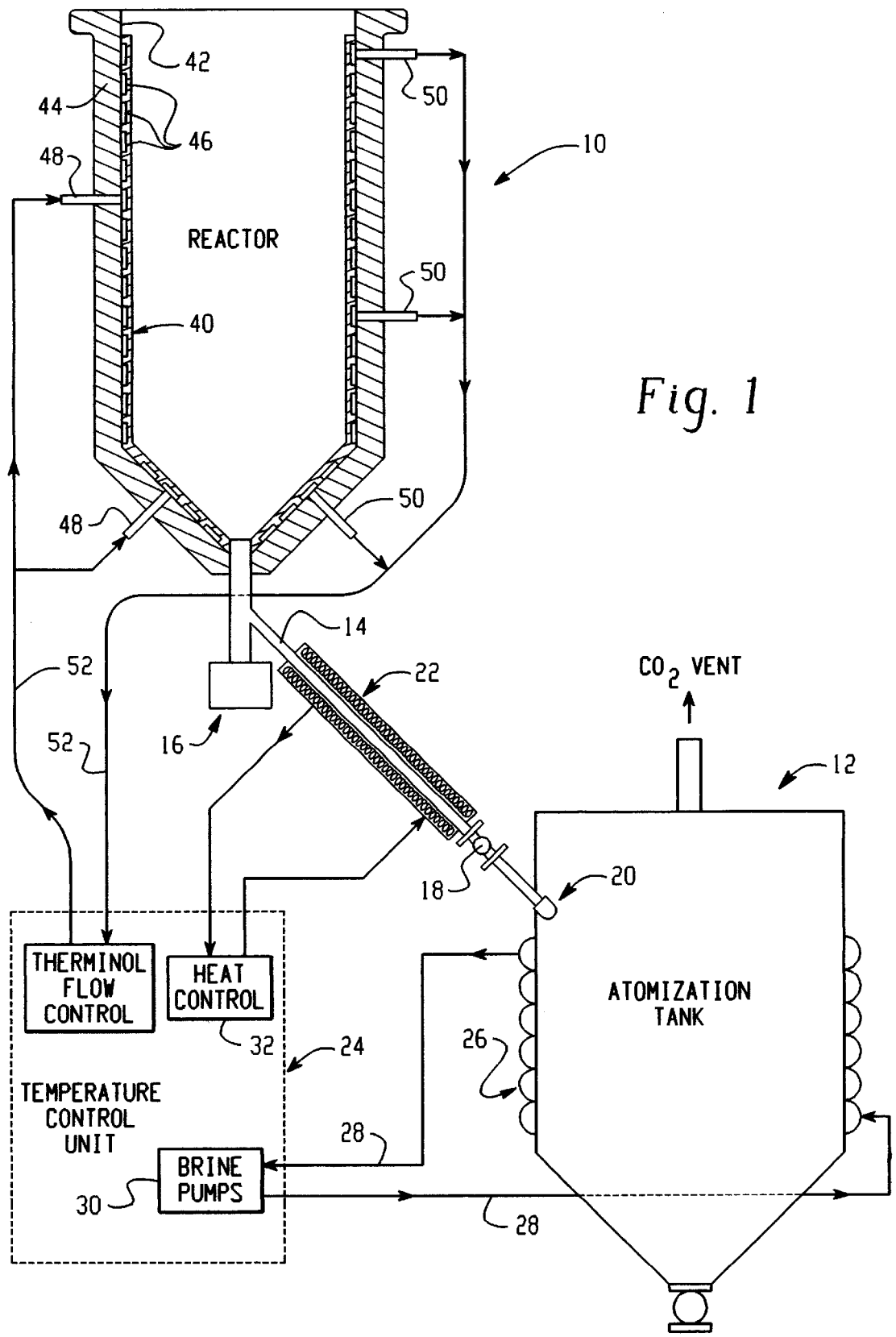
FIG. 1 is a simplified schematic representation of a pressure vessel (and receiver vessel) shown in partial cross-section in accordance with the invention.

With reference to FIG. 1, there is illustrated in elevation an embodiment of a pressure vessel 10 in accordance with the present invention. Many of the details concerning the operation and control of the overall system are provided in the referenced disclosures, and reference can be made thereto for further explanation of the reaction processes and controls. The present invention is directed primarily to the pressure vessel 10 and to the agitator (not shown in FIG. 1) that is disposed within the pressure vessel 10. The pressure vessel 10 is connected to the receiver vessel 12 via a transfer piping arrangement 14. A flush valve assembly 16 is used to control transfer of material within the pressure vessel 10 through the piping 14 to the receiver vessel 12. Near the receiver vessel 12 the transfer piping 14 opens to an orifice 18 which further opens to the receiver vessel 12 via a tangential opening 20 in the receiver vessel wall. The fluid connection between the pressure vessel 10 and the receiver vessel 12 can be realized as described in the referenced disclosures, for example, or alternatively the improved flush valve, orifice and tangential opening in the receiver vessel 12 as described in my co-pending U.S. patent application, Ser. No. 08/882,118 filed on Jun. 25, 1997 and entitled "DELIVERY SYSTEM FOR PROCESSES USING SUPERCRITICAL FLUIDS", the entire disclosure of which is fully incorporated herein by reference.

The transfer piping 14 can be equipped with band heaters 22 to prevent icing and coalescing of the material as it flows to the receiver vessel due to substantial temperature changes caused by the pressure drop from the pressure vessel 10 (for example, at 3000 psi) to the receiver vessel 12 (for example, at 300 psi). The band heaters are controlled via a temperature control unit 24 as will be described in greater detail hereinafter.

Although not part of the present invention, the receiver vessel 12 is preferably provided with an external heat/cool jacket 26 also controlled by the temperature control unit 24. The heat transfer fluid that flows through the receiver jacket 26 may be brine or therminol D12, for example, forced through the jacket 26 via piping 28 by suitable pumps 30 that are part of the temperature control unit 24. Heating and/or cooling elements can be provided with the temperature control unit 24 to adjust the temperature of the brine based on the required temperature within the receiver vessel 12. Conventional temperature sensors (not shown) such as thermocouples can be used to monitor the temperature within the receiver vessel. The temperature control unit 24 can also be provided with a conventional band heater control circuit 32 if required.

With continued reference to FIG. 1, and in accordance with one aspect of the invention, the pressure vessel 10 includes an inner liner 40 (in FIG. 1 the agitator is omitted for clarity). The liner 40 (or alternatively the inner surface 42 of the vessel wall 44) has a number of fluid channels 46 or conduits formed therein. In the drawings, the relative size of the channels is somewhat exaggerated for clarity and ease of illustration. A heat transfer fluid is pumped through the channels 46 to control the temperature inside the pressure vessel 10. Preferably, the liner 40 is made of a material with a very high heat transfer coefficient. In the present embodiment, the liner 40 is made of nickel. Alternative materials include aluminum, beryllium, cadmium, chromium and copper to name just a few examples. Alloys, such as for example alloy cast irons, can alternatively be used. The metal or material selected for the liner 40 will be determined in part by the choice of heat transfer fluid (in this example, therminol). The liner 40 should also be durable and resistant to the materials that are introduced into the pressure vessel 10. A number of inlet ports 48 and outlet ports 50 are provided. These ports are in fluid communication with the channels 46 and are used to supply and return the heat transfer fluid (represented by the directional flow arrows 52) through suitable piping from and to the temperature control unit 24. Generally, the temperature control unit 24 will control the temperature of the heat transfer fluid as instructed by the main system controller as described in the referenced disclosures. The temperature control unit can also be equipped with orifice flow meters and other monitoring apparatus to control flow rates and temperature of the heat transfer media through the liner 40 and the external jacket 26 as required.

In this embodiment, the heat transfer fluid is therminol D12 available from Dow Chemical or Monsanto. Other heat transfer fluids suitable for use include steam, brine, oil and glycerol to name just a few examples. The heat transfer fluid selected, along with the selected material for the liner 40, will be based in part on the degree of heat transfer capability required for a specific system. In many cases, it will be desirable to maximize heat transfer so as to provide a convenient means for accurate and fast control of the temperature of the reaction mixture within the pressure vessel 10.

Figure 2:
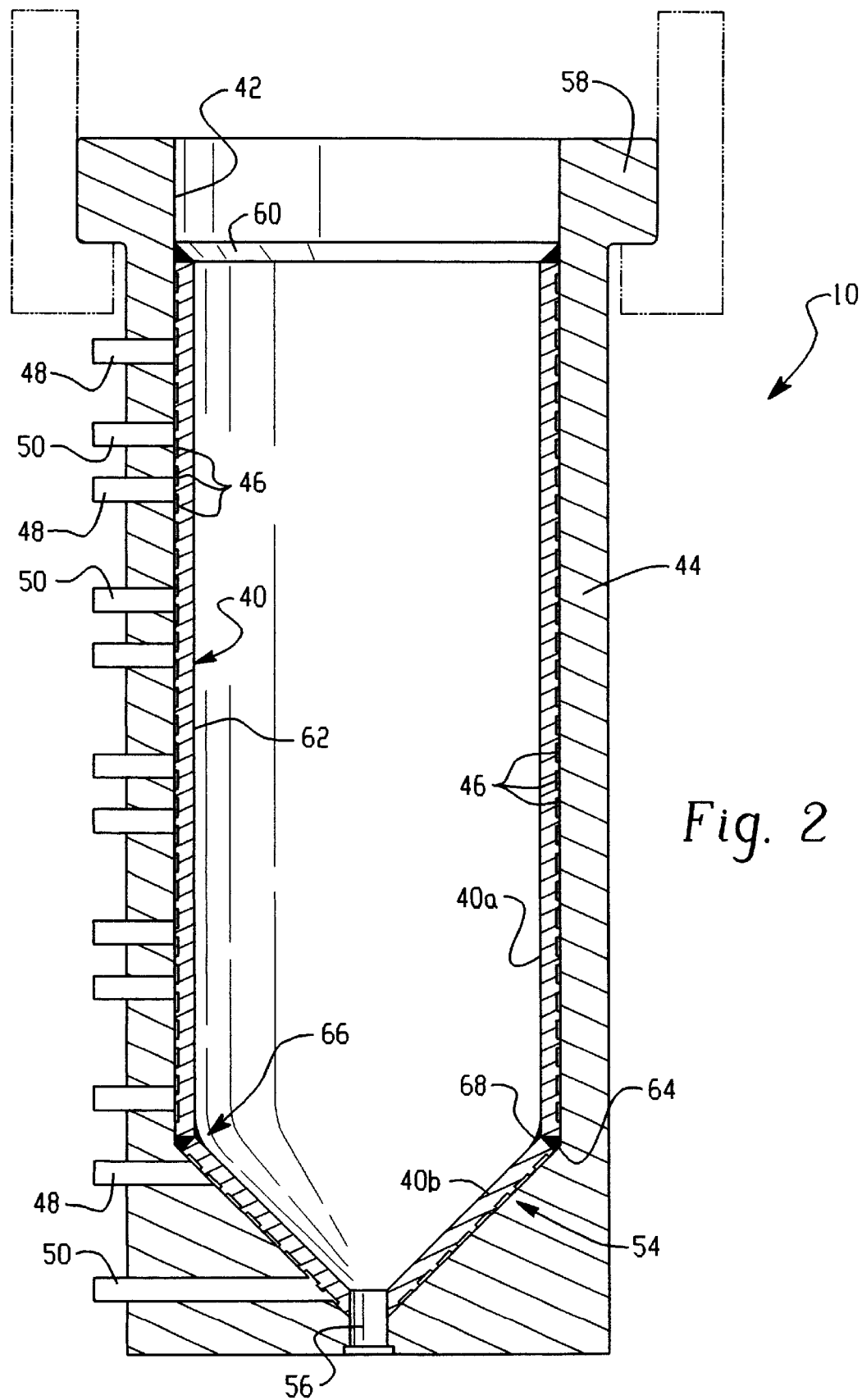
FIG. 2 is a more detailed illustration in partial cross-section of the pressure vessel in FIG. 1.

With reference next to FIG. 2, a more detailed illustration of the pressure vessel 10 is provided (again for clarity the agitator is omitted). The pressure vessel 10 in this case includes a generally cylindrical body wall 44 and a generally conically shaped bottom end 54. The conical portion 54 can be welded or otherwise attached to the bottom of the cylindrical body 44. The conical end 54 is truncated to provide an outlet opening 56, which can be provided with a flange to permit the flush valve assembly 16 (FIG. 1) to be mounted thereon.

The upper end of the cylindrical body 44 can also be equipped with a flange 58 which is used to support the pressure vessel 10 on a support structure (shown in phantom in FIG. 2). Although omitted from the drawings for clarity, the support structure also supports the drive motor for the agitator which is suspended within the pressure vessel 10, as will be described hereinafter.

The liner 40 is attached to the interior surface 42 of the pressure vessel 10 by any convenient means. In this case, the liner 40 is welded to the pressure vessel wall 44, as at upper weld joint 60. Since the vessel 10 is generally a two piece unit, so too the liner 40 includes a generally cylindrical 40a and a conical lower portion 40b (alternatively, the liner could be made as a single integral piece, for example). Several features of the liner 40 enhance its heat transfer characteristics. The liner 40 preferably is relatively thin to provide maximum heat transfer from the heat transfer fluid flowing through the channels 46 to the reaction mixture inside the vessel 10. In general, the heat transfer capability of the liner 40 decreases with increasing thickness of the liner 40. The liner 40 must be thick enough, however, to withstand the pressure of the fluid therein, as well as to avoid rupturing should the agitator (within the pressure vessel 10) come into contact therewith. A liner 40 of thickness on the order of 0.2 to 1.4 inches has been found suitable for the present invention, but these values are exemplary only and not limiting as to the scope of the invention. Heat transfer rates on the order of 0.75 to 2.5 million BTU/hr can be readily achieved, with again these values being exemplary and not limiting as to the scope of the invention.

In this embodiment, the liner 40 is formed so as to closely conform with the interior geometry of the vessel 10, thus permitting the liner 40 to take up very little space within the tank, while at the same time being in intimate thermal contact with the reaction mixture as it circulates within the tank under the motive force of the agitator. It is important that the liner 40 be made of a sturdy material so that should the agitator deflect and hit the liner interior surface 62 the liner 40 will not rupture. Nickel is thus a preferred, though not exclusive material, for making the liner 40 due to its high heat conductivity and good strength. Note that preferably the cylindrical portion 40a and the conical portion 40b of the liner 40 are both provided with the channels 46, thus permitting excellent heat transfer and temperature control along the entire length of the pressure vessel 10.

The bottom of the liner cylindrical portion 40a and the top of the conical liner portion 40b are attached to the vessel wall 44 by any convenient means. In this case, a single lower weld joint 64 serves this purpose.

The juncture or knuckle 66 of the cylindrical liner portion 40a and the conical portion 40b at the lower weld joint 64 is provided with a reinforced raised inner surface 68. This reinforced area is referred to herein as a sacrificial deflection plate. It will be noted that within the area of the sacrificial plate 68 there are no channels 46 for the heat transfer fluid. Although a small amount of temperature control is lost or sacrificed in this region, the region is quite small. But, the reinforced knuckle 66 provides a strengthened area that can absorb impact of the agitator should the agitator be deflected against the wall of the liner 40. This further reduces the chance that the liner 40 could rupture, thereby releasing therminol or other heat transfer fluid into the reaction mixture, or even allowing material from the pressure vessel to back flow to the temperature control unit 24 pumps.

In this embodiment, the channels 46 are formed as grooves in the outer surface of the liner 40. The channels 46 can all be interconnected as a single continuous channel if so required, or the channels can be grouped and isolated, for example along the longitudinal vertical axis of the vessel 10, to provide zonal temperature control, if so required. The channels 46 can also be isolated in groups, but then selectively interconnected by a series of hoses or piping on the exterior of the pressure vessel 10 (See FIG. 3). For example, in cases where the reinforced knuckle 66 is used, the channels in the conical portion 40b can be connected to the channels in the cylindrical portion of the liner by exterior tubing or pipes. Alternatively, for example, each zone can be separately fed from the temperature control unit 24. Many alternative configurations will be readily apparent to those skilled in the art. For example, separate channels could be provided for heating and cooling. As another example, note that in FIG. 2 all the ports are generally along a single line, but in the embodiment of FIG. 1 some of the ports are on opposite diametric sides of the tank. In the case of preparing powder coatings, typically the heat transfer fluid will be used for cooling as the agitator and reaction process will produce sufficient heat and pressure and there will be a need for cooling. However, the liner 40 can also be used as a heat source as required.

In the embodiment of FIG. 2, numerous inlet and outlet ports 48, 50 are provided. Each port can be realized in the form of a tube or pipe that extends through the wall 44 of the pressure vessel 10 and opens to its respective channel 46. The number of ports utilized will depend on the extent of temperature control required along the length of the pressure vessel 10. Longer tanks may cause significant temperature variations along the length of the tank during a reaction process.

Figure 3:
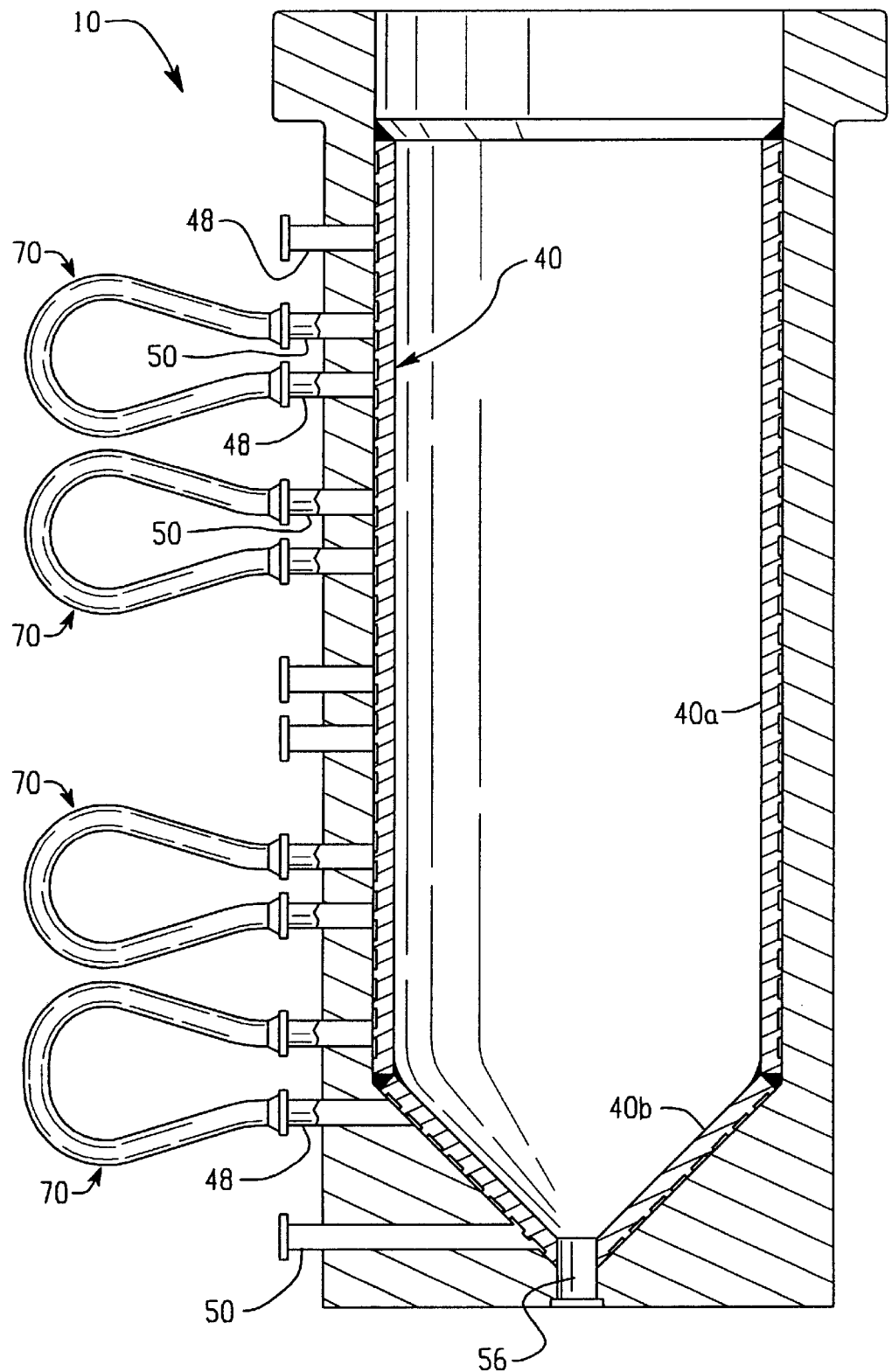
FIG. 3 illustrates a typical interconnection arrangement for the supply of heat transfer fluid to the pressure vessel of FIG. 1.

A typical interconnection scheme is illustrated in FIG. 3. In this illustration, the connections to the temperature control unit 24 are omitted for clarity. In FIG. 3 a number of the ports 48, 50 are interconnected by hoses 70 to provide zonal temperature control. Note in this embodiment the lower hose 70 is used to interconnect the channels in the conical portion 40b with the channels in the lower end of the cylindrical portion 40a. The ports that are not shown as being interconnected are connected by suitable hoses or piping to the inlets and outlets of the temperature control unit 24 pumps. Also, various pressure and temperature sensors (not shown) can be provided at the various ports for providing control feedback signals to the temperature control unit and main control system.

Because heat transfer is an important function of the liner 40, it is preferred that the heat transfer fluid be pumped through the liner 40 in the form of a turbulent non-laminar flow. Flow meters and pressure and temperature sensors (not shown) can be used to monitor pressure drop and fluid flow rates through the various zones to assure turbulent flow. Baffles and other structures can be provided as required to enhance a turbulent flow through the liner 40.

Figure 4A:
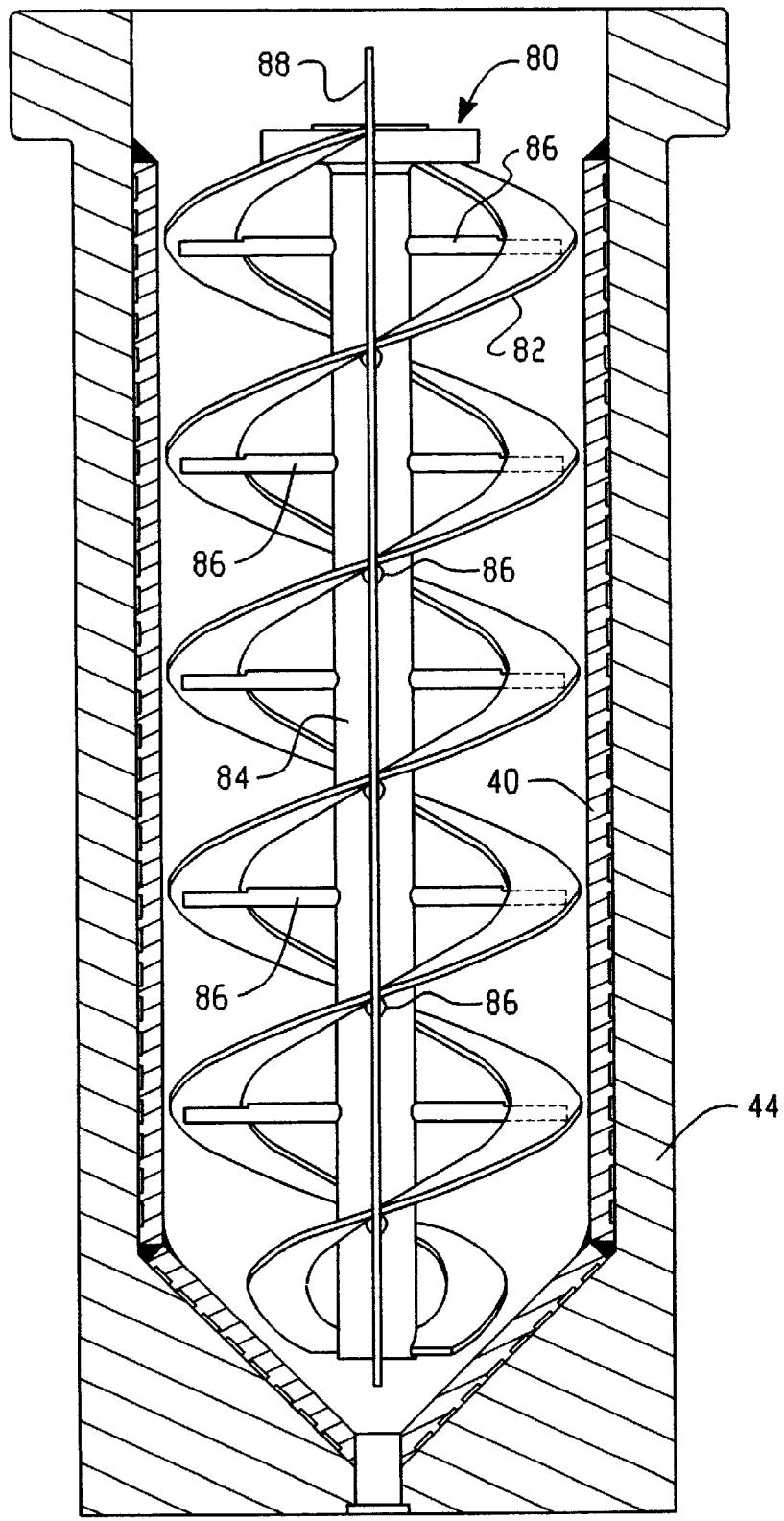
FIGS. 4A and 4B illustrate an agitator in accordance with the invention, with FIG. 4B showing the agitator in a position rotated 90 degrees from the position of FIG. 4A.
Figure 4B:
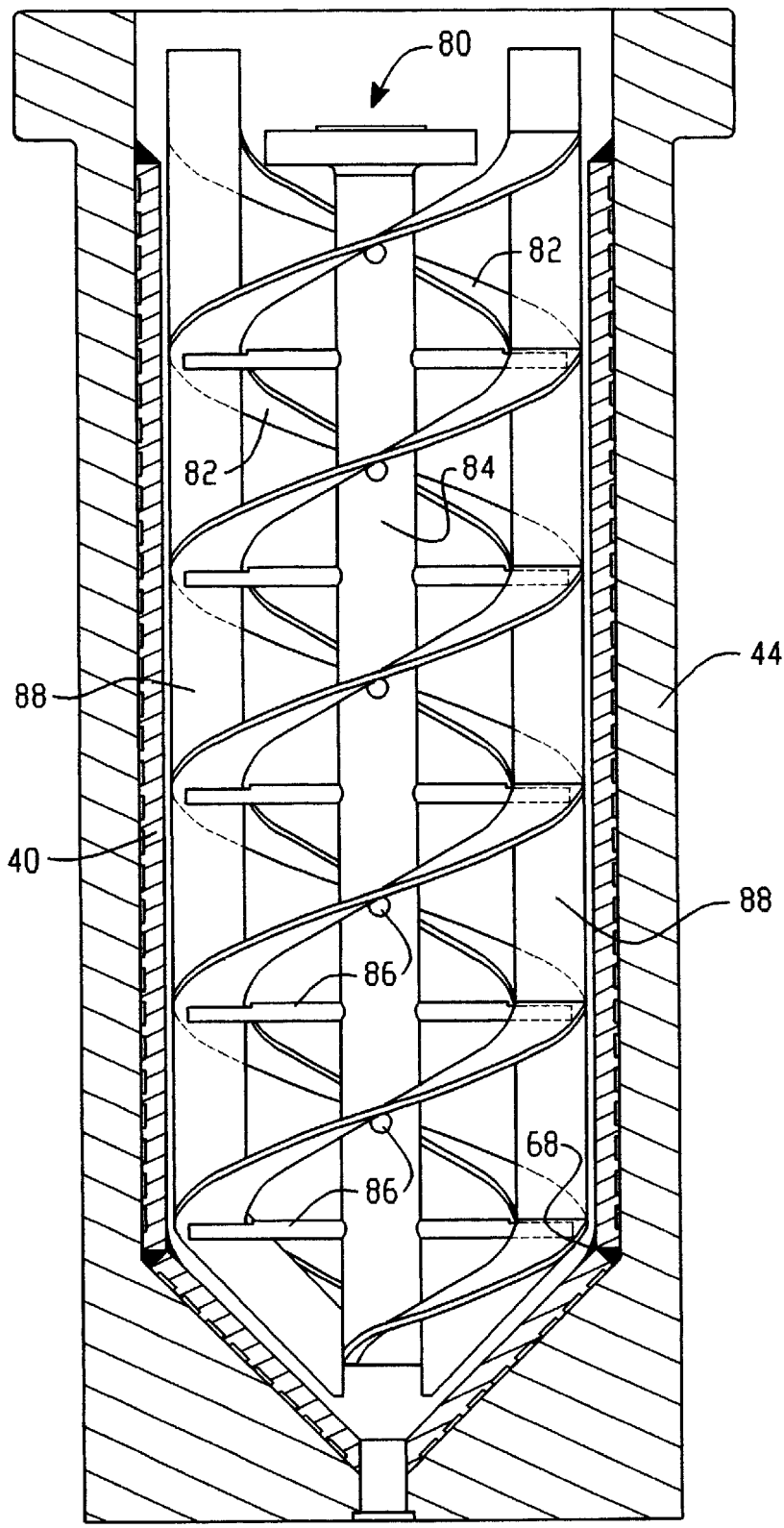

With reference next to FIGS. 4A and 4B, in accordance with another aspect of the invention, an agitator 80 is provided within the pressure vessel 10. FIG. 4B shows the agitator rotated ninety degrees from the position shown in FIG. 4A. The agitator 80 in this case is suspended from a support structure above the vessel 10 that includes the drive motor for the agitator 80 (not shown). The agitator 80 is generally in the form of two elongated and intertwined serpentine blades 82 that form a double helix configuration. Each helical blade 82 is supported on a main shaft 84 by a number of support arms 86 which in this case are generally evenly spaced along the longitudinal axis of the shaft 84.

In the case of making powder coatings, the reaction mixture within the vessel 10 can be rather high in viscosity. The agitator 80 is used for mixing and dispersion, and therefore preferably the agitator is designed to significantly work the reaction mixture to circulate it within the vessel. In some applications it will be useful to have a reversible drive motor, such as a DC variable motor available from Siemans. The agitator 80 thus will tend to contribute a significant temperature increase to the mixture in the form of work performed in circulating the mixture throughout vessel 10. The double helix and fairly low flight angle of the blades 82 produce a high work output from the agitator 80 to produce these effects. The main shaft 84 is preferably made of a very hard non-deflecting material such as 316 stainless steel, as are the support arms 86 and blades 82. The exposed surfaces of the agitator 80 can be Stellited if required for added stiffness and hardness, as well as electropolished.

The outer sweep diameter of the blades 82 is selected to be slightly less than the inner diameter of the liner 40. In this way, the circulating mixture is exposed to a large thermal transfer surface of the liner 40 for excellent temperature control of the reaction mixture.

It will be apparent from FIG. 4A that the agitator 80 is suspended from the top of the vessel 10 (such as from a journal bearing coupled to the drive motor, not shown), and that there is no lower support bearing or other structure at the lower end of the agitator 80. Due to the potentially high viscosity of the reaction mixture, as well as the possible high rotation speeds of the agitator, the agitator 80 may be subject to small deflections, and these deflections will be most often extreme at the lower end of the agitator 80. Thus, as is apparent from FIG. 4B, the sacrificial deflection plate 68 described herein above absorbs the impacts of the agitator 80 to prevent a rupture of the liner 40.

As also shown in FIGS. 4A and 4B, the agitator 80 includes a pair of diametric opposed radial blades 88. The radial blades 88 are, in this case, located towards the periphery of the agitator double helix, and extend along and generally parallel to the length of the main shaft 84. The blades are formed as a helix to impart both a vertical pumping action (down or up depending on the direction of rotation of the agitator 80) as well as a radial motion so as to circulate the mixture towards the nickel liner 40. The radial blades 88 operate to impart a circular motion to the reaction mixture as the agitator 80 rotates, further increasing the energy put into the mixture by operation of the agitator 80. The radial blades 88 may be supported by the support arms 86 and or the double helix blades 82. This tends to maximize dispersion along the liner wall and produces wall shear to facilitate the mixing process and heat transfer. In the described embodiment, the blades 80 are individually forged and then welded to the support arms, so that each helix is made up of a number of separate blade pieces.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. Apparatus for a process using supercritical process media comprising:

a pressure vessel including an agitator for mixing a batch of materials therein;

a source connected to the pressure vessel for supplying process media to the pressure vessel;

heat transfer means for maintaining the process media in the pressure vessel in a supercritical state;

delivery means for introducing batch materials into the pressure vessel that are mixed in the presence of the process media in a supercritical state to produce a reaction mixture based on a selectable reaction process;

said heat transfer means comprising a liner that generally conforms to an interior surface geometry of the pressure vessel with said liner comprising a high thermal conductivity material;

said liner comprising an interior heat transfer surface in thermal exchange with the reaction mixture and a plurality of fluid channels;

heat transfer fluid that circulates turbulently through said channels and in thermal exchange with said heat transfer surface;

heat transfer fluid supply means exterior to the pressure vessel for circulating said heat transfer fluid through said channels;

said pressure vessel having a shape of an elongated cylinder with said interior surface geometry having a conically tapered outlet at one end of the cylinder;

said liner having a cylindrical portion that generally conforms to the interior cylindrical portion of the pressure vessel and a conical portion that generally conforms to the interior conically tapered end of the pressure vessel; and said liner conical portion being contiguous with one end of said liner cylindrical portion to form an elbow; said liner including a reinforcing deflection plate in the area of said elbow to absorb impact of the agitator to prevent rupture of said liner.

2. The apparatus of claim 1 wherein said liner in said elbow area omits said channels.

3. The apparatus of claim 1 wherein said heat transfer fluid comprises therminol.

4. The apparatus of claim 1 wherein said agitator is supported at one end longitudinally within the pressure vessel from a support structure at an inlet end of the pressure vessel opposite said pressure vessel outlet end; an opposite end of said agitator hanging free within the pressure vessel proximate said deflection plate.

5. The apparatus of claim 4 wherein said agitator comprises impeller blades in the form of a double helix with reinforcing blade supports distributed along the length of said agitator.

6. The apparatus of claim 5 wherein said agitator comprises a plurality of longitudinally extending radial impellers attached to said double helix blades along the agitator periphery and which impart a circular motion and wall shear to the reaction mixture.

7. The apparatus of claim 1 wherein said liner comprises nickel.

8. The apparatus of claim 1 comprising temperature control means for adjusting the temperature of the heat transfer fluid to maintain the process media in a supercritical state within the pressure vessel.

9. Apparatus for a process using supercritical process media, comprising:

a pressure vessel;

an agitator for mixing a batch of materials and a process media in a supercritical state in the pressure vessel to produce a reaction mixture based on a selectable reaction process;

heat transfer means for controlling temperature of the reaction mixture, said heat transfer means comprising a liner that generally conforms to an interior surface geometry of the pressure vessel, with said liner comprising a high thermal conductivity material;

said liner comprising an interior heat transfer surface in thermal exchange with the reaction mixture, and a plurality of fluid channels;

heat transfer fluid that circulates through said channels and in thermal exchange with said heat transfer surface;

heat transfer fluid supply means exterior the pressure vessel for circulating said heat transfer fluid through said channels;

said pressure vessel having a shape of an elongated cylinder with said interior surface geometry having a conically tapered outlet at one end of the cylinder;

said liner having a cylindrical portion that generally conforms to the interior cylindrical portion of the pressure vessel and a conical portion that generally conforms to the interior conically tapered end of the pressure vessel; and said liner conical portion being contiguous with one end of said liner cylindrical portion to form an elbow; said liner including a reinforcing deflection plate in the area of said elbow to absorb impact of the agitator to prevent rupture of said liner.

10. The apparatus of claim 9 wherein said liner in said elbow area omits said channels.

11. The apparatus of claim 9 wherein said agitator is supported at one end longitudinally within the pressure vessel from a support structure at an inlet end of the pressure vessel opposite said pressure vessel outlet end; an opposite end of said agitator hanging free within the pressure vessel proximate said deflection plate.

12. The apparatus of claim 11 wherein said agitator comprises impeller blades in the form of a double helix with reinforcing blade supports distributed along the length of said agitator.

13. The apparatus of claim 12 wherein said agitator comprises a plurality of longitudinally extending radial impellers attached to said double helix blades along the agitator periphery and which impart a circular motion to the reaction mixture.

14. The apparatus of claim 9 wherein said liner comprises nickel.

15. The apparatus of claim 9 comprising temperature control means for adjusting the temperature of the heat transfer fluid to maintain the process media in a supercritical state within the pressure vessel.

16. The apparatus of claim 1 wherein said channels are formed in an exterior surface of said liner subjacent said interior surface.

17. The apparatus of claim 1 wherein said channels are divided into a plurality of separate temperature control zones distributed longitudinally along the length of the pressure vessel.

18. The apparatus of claim 9 wherein said channels are formed in an exterior surface of said liner subjacent said interior surface.

19. The apparatus of claim 9 wherein said channels are divided into a plurality of separate temperature control zones distributed longitudinally along the length of the pressure vessel.

* * * * *